Jan. 30, 1951 | E. H. DANIEL ET AL | 2,539,611

TAPE SPLICER

Filed Feb. 2, 1948 | 2 Sheets-Sheet 1

INVENTORS
Eliot H. Daniel
BY Kenneth L. Darby

ATTORNEY

Jan. 30, 1951 E. H. DANIEL ET AL 2,539,611

TAPE SPLICER

Filed Feb. 2, 1948 2 Sheets-Sheet 2

INVENTORS
Eliot H. Daniel
BY Kenneth L. Darby
[signature]
ATTORNEY

Patented Jan. 30, 1951 2,539,611

UNITED STATES PATENT OFFICE 2,539,611

TAPE SPLICER

Eliot H. Daniel, North Hollywood, and Kenneth L. Darby, Van Nuys, Calif.

Application February 2, 1948, Serial No. 5,864

10 Claims. (Cl. 154—42.3)

This invention is directed to an apparatus for permitting editing of sound recordings carried by flexible tape including a layer or coating of ferromagnetic material. Generally speaking, this invention relates to tape-splicing apparatus adapted to join flat, flexible tape in end-to-end, aligned relationship in the same plane. This is accomplished by superimposing on adjacent surfaces of adjacent, contiguous, severed ends of the tape a piece of pressure-sensitive, adhesive ribbon which is pressed into firm, adhesive contact with the aligned tape ends.

The splicer of this invention has many uses but is primarily directed to the joining together of the severed ends of a flat, flexible paper tape which is impregnated or coated on one side with particles of ferromagnetic material which may be magnetically recorded. In sound editing a magnetic recording of the character stated, it is necessary to remove certain portions of the recording which may carry undesired sounds or portions which it is desired to delete. This is accomplished by severing the tape on both sides of the portion to be deleted and joining or splicing the opposed, severed ends of the magnetically recorded tape after removal of the deleted portion.

However, in joining together the severed ends of the tape, a problem is encountered, since the usual way of joining the ends of a paper tape is to cement or otherwise cause them to adhere to each other in overlapping relationship with the end of one piece of tape lying in a plane parallel to the end of the other piece of tape. This arrangement is satisfactory from the standpoint of mechanical strength and tape flexibility, but it is completely unsatisfactory from the standpoint of a magnetoacoustic transducer, since the portion of the spliced tape wherein one layer of tape overlaps or overlies a second layer of tape will contain two layers of the ferromagnetic particles, thus providing a much greater magnetomotive force or permeability at this point of the tape, which will be translated by the magnetic reproducer into undesirable acoustic output. Therefore it is necessary that the two severed ends of the magnetically recorded tape be joined together in abutting, end-to-end, aligned relationship in the same plane, so that at no point in the tape will two layers of the ferromagnetic material overlie one another.

The apparatus of this invention produces such a splice wherein the junction of the two aligned ends of the tape is effected by a common overlying piece of pressure-sensitive, adhesive ribbon.

This provides a splice of adequate flexibility and mechanical strength which in no way interferes with the magnetoacoustic transducing properties.

Furthermore, in a complete device, a magnetoacoustic transducer may be positioned for cooperation with the magnetically recorded tape ahead of the severing and splicing point for rendering audible the recording carried thereby, so that the portions of the recording which it is desired to delete may be audibly located, thus facilitating sound editing of the entire recording.

At the present time there is no prior art splicer capable of achieving the hereinabove-indicated, desirable ends and the present invention provides the solution to a major problem in the art.

Generally speaking, the apparatus of this invention comprises a splicer adapted to splice flat, flexible tape in end-to-end, aligned relationship in the same plane, including a tape-guiding channel arranged to carry and guide a tape to be spliced; selectively operable friction means for locking and immobilizing the tape in said channel; severing means for selectively severing the immobilized tape; and selectively operable means for feeding virtually perpendicularly toward the tape-severing point a ribbon having a pressure-sensitive, adhesive surface, means for shearing a piece of preselected size from said ribbon, and means for pressing said ribbon into adhesive contact with the adjacent surfaces of the adjacent, contiguous, aligned, severed ends of the tape for splicing said tape together.

With the above points in mind, it is an object of this invention to provide a splicer adapted to splice flat, flexible tape in abutting, end-to-end, aligned relationship in the same plane.

It is a further object of this invention to provide a sound editor adapted to edit a magnetically recorded sound track and including a splicer adapted to splice flat, flexible, magnetically recorded tape in end-to-end relationship in the same plane and a magnetoacoustic transducer positioned for cooperation with the magnetically recorded tape ahead of the splicing region, whereby the portions of the magnetic recording which it is desired to delete may be audibly ascertained.

Other and allied objects will be apparent to those skilled in the art upon a careful examination and study of the illustrations, specification, and appended claims. To facilitate understanding, reference will be had to the following drawings, in which:

Figure 1:
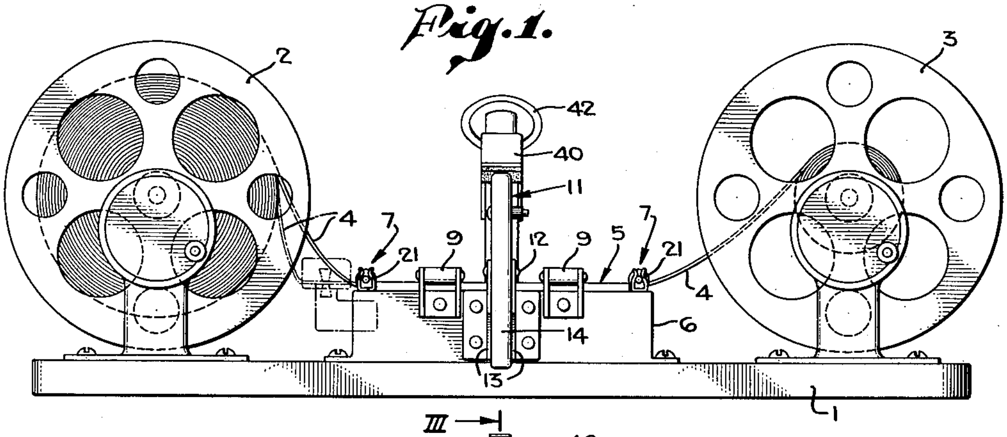
Fig. 1 is a front elevational view of one illustrative embodiment of the invention.
Figure 2:
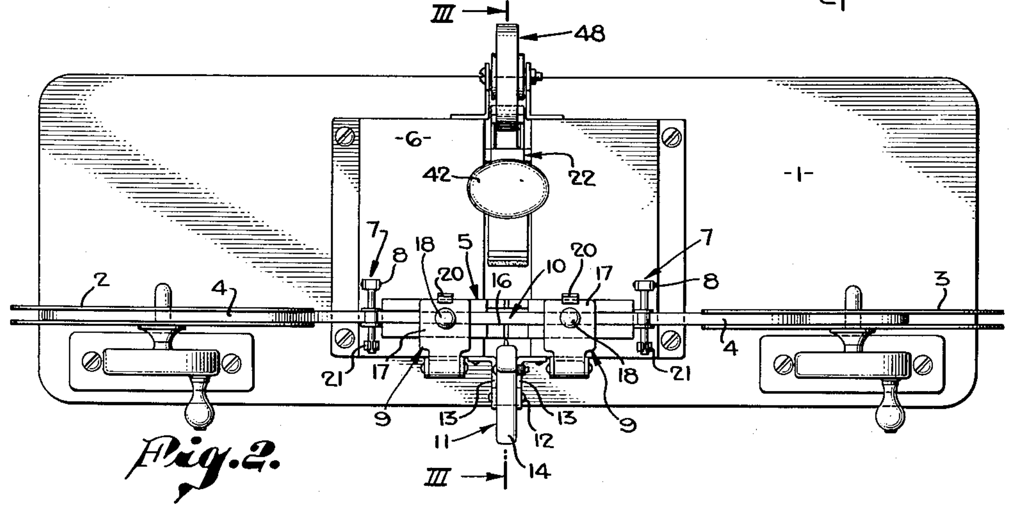
Fig. 2 is a plan view of the apparatus shown in Fig. 1.

In the illustrative form of device shown in Figs. 1–4, a suitable base 1 is provided with brackets carrying two reels, a tape magazine reel 2 and a tape take-up reel 3 arranged to carry a tape 4. The two reels are laterally spaced apart and between them a tape-guiding channel, indicated generally at 5, is positioned. The tape-guiding channel 5 is carried by a suitable support 6 mounted upon the base 1. Two selectively operable roller means, indicated at 7, are pivotally mounted upon the support 6 at 8 for selective cooperation with the tape 4 for retaining the tape within the channel 5. Two selectively operable tape-immobilizing means 9 are pivotally mounted with respect to the support 6 and arranged for frictional engagement with the tape 4 in the channel 5 for frictionally engaging and immobilizing the tape on each side of the central, tape-severing and tape-splicing region of the tape, which is indicated generally at 10.

Selectively operable tape-severing means, indicated generally at 11, is pivotally mounted at 12 between two bracket arms 13 carried by the support 6 in a position such that upward pivotal movement of a handle 14 on one end of the severing means 11 produces a downward, arcuate movement of a knife blade 15 carried by the other end of the severing means 11, causing the knife blade 15 to sever the tape 4 transversely. It should be noted that the channel 5 is provided with a notched receiving plate at 16 adapted to receive the knife edge 15 for facilitating the severing of the tape 4 which has previously been immobilized by positioning each of the tape-immobilizing means 9 in frictional contact with the tape in the channel 5 on each side of the tape-severing point 10.

Figure 3:
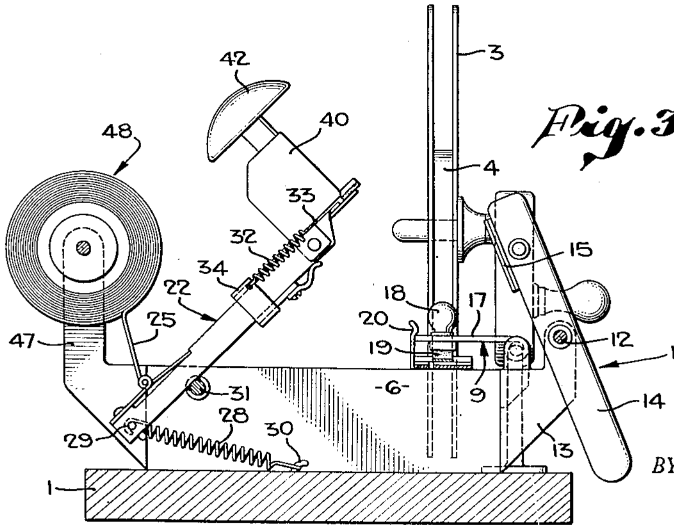
Fig. 3 is a side elevational, sectional view taken along plane III—III of Fig. 2.

One of the tape-immobilizing means 9 is more fully shown in Fig. 3. A pivotally mounted member 17, having an actuating handle 18, carries a friction block 19 arranged to fit within the channel 5 and frictionally engage the upper surface of the tape 4. It is preferable that these tape-immobilizing means 9 be of a snap-action type adapted upon actuation to either fly into immobilizing contact with the tape or to become completely disengaged from the tape. In the example illustrated in Fig. 3, a spring-action retaining clip 20 grasps the free end of member 17, but it should be understood that any snap-action, friction-locking means may be provided.

It should be noted that the guide rollers 7 are preferably of the snap-action type also. In the example shown, the forward ends of said guide rollers are retained by spring retaining means, indicated at 21. However, any suitable type of snap-action may be employed.

Figure 4:
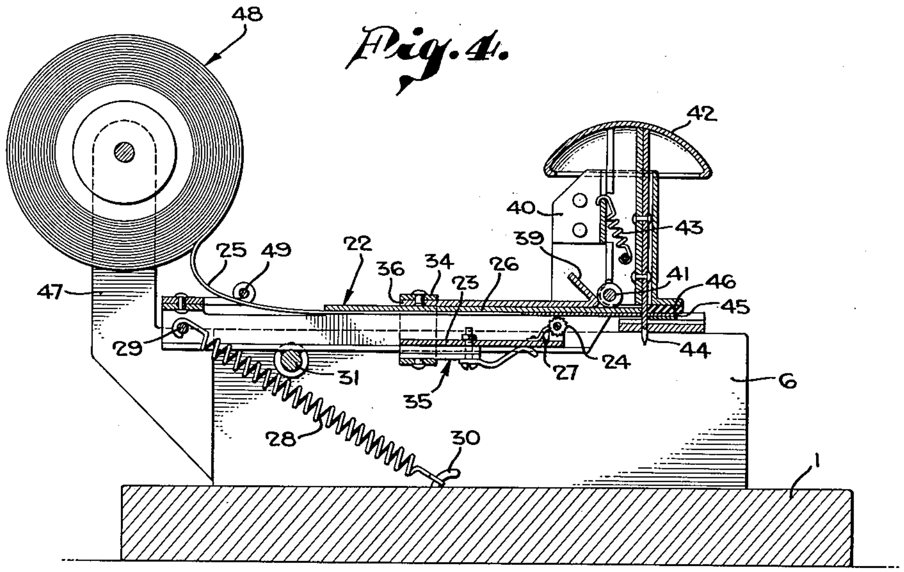
Fig. 4 is an enlarged view of the mechanism shown in Fig. 3 for feeding the pressure-sensitive, adhesive ribbon, pressing the end of such ribbon into contact with the aligned ends of the severed tape, and shearing a ribbon end from the balance thereof.

Adhesive ribbon-dispensing means are provided and include means arranged to feed virtually transversely toward the tape-severing and splicing zone, indicated at 10, a pressure-sensitive, adhesive ribbon and ribbon-applying means arranged to press the forward end of said ribbon into adhesive contact with the upper surface of the adjacent, contiguous, severed, aligned ends of the tape 4. The ribbon-dispensing means also includes ribbon-shearing means arranged to shear the adhering portion of the ribbon from the balance of the ribbon. This is best shown in Figs. 3 and 4 and includes a feed arm 22, which, in the example shown, is of channeled cross section and is pivotally mounted adjacent the rear end thereof at 31 in the support 6 about an axis virtually parallel to the tape-guiding channel 5. Positioned so as to be capable of reciprocatory movement with respect to the feed arm 22 is a ribbon-feeding carriage 23, positioned within the channel of the feed arm 22 (see Fig. 4). The ribbon-feeding carriage 23 carries suitable ratchet means, indicated at 24, arranged to be in engagement with the pressure-sensitive adhesive under side of a pressure-sensitive ribbon 25 extending from roll 48 under the top wall 26 of the channeled feed arm 22. The ratchet means 24 is so arranged that rearward reciprocatory movement of the carriage 23 and ratchet means 24 causes the ratchet to roll along the pressure-sensitive, adhesive, under side of the ribbon 25, whereas forward movement of carriage 23 and ratchet means 24 causes the ratchet means 24 to be rotatively immobilized by cooperating pawl means 27, the ratchet means 24 frictionally engaging the under side of the adhesive ribbon 25 and positively, forwardly feeding such ribbon toward the tape-severing and splicing zone 10.

It should be noted that in the arrangement disclosed in Figs. 3 and 4, the feed arm 22 is normally biased into upright position by the spring 28 which is connected to a pin 29 at the rear end of the feed arm 22 and to a pin 30 carried by the base 1.

In the embodiment illustrated, a predetermined portion of the pressure-sensitive, adhesive, splicing tape is at all times available and pivotal movement of arm 22 about pivot 31 automatically splices the ends of tape 4 and insures the feeding of another predetermined portion of adhesive tape. Carriage 23 is connected by an element 35 to a square ring 34 slidable along feed arm 22. The ring carries a forward extension 36 provided with a cam portion 39 extending into the vertical housing 40. The housing is fixedly mounted on the forward end of the feed arm 22 and includes a vertically reciprocable assembly including a transverse roller 41 arranged to engage the cam surface 39, a forward presser foot 46 and a knife 44, this vertically movable assembly being actuated by a knob 42 and normally biased into a raised position by a spring 43 connecting the assembly and a fixed part of the housing 40.

The carriage 23, ring 34 and member 36 are normally held in a forward position by means of a spring 32, one end of the spring being attached to the ring 34 and the other end of the spring being attached to the arm 22 at 33. In such forward position, with the knob 42 in its upper position, the cam surface 39 is beneath the roller or shoe 41.

The forward end of the adhesive ribbon 25 is beneath the presser foot or plate 46. As the arm 22 is pivoted clockwise in Fig. 3 into the position shown in Fig. 4, by an operator exerting pressure against the knob 42, the presser foot 46 will first press the extending, predetermined portion of the adhesive ribbon against the adjacent, abutting ends of the tape 4 in zone 10. Increasing downward pressure against the knob 42 will cause the shoe or roller 41 to contact cam 39 and move the entire carriage 23 rearwardly. During this rearward movement of the carriage, the adhesive ribbon is firmly held by the shoe against the abutting ends of the tape. Further downward pressure against knob 42 causes the severing knife 44 to move downwardly to cut off the portion of the adhesive ribbon used in splicing. The length of the arm 22 and the plane in which knife 44 moves are such that this severing action takes place at a point immediately adjacent the longitudinal edges of the tape 4. When pressure upon knob 42 is released, spring 43 returns the vertically movable assembly to its upright position, withdrawing knife 44 and roller 41, permitting the carriage 23 and ratchet 24 to move along the arm 22, feeding another predetermined amount of adhesive ribbon forward in the channel of arm 22 before arm 22 returns to its upright position under the influence of spring 28.

The rear portion of the support 6 is provided with two spaced, upstanding arms 47 arranged to carry a roll 48 of the pressure-sensitive, adhesive ribbon 25. The roll 48 is so arranged that the pressure-sensitive, adhesive ribbon 25 being unrolled therefrom passes through an opening in the feed arm 22, under a cross bar 49 in the rear portion of arm 22, with the rear, non-adhesive surface of the ribbon 25 in sliding contact with the cross bar, and then into position below the top wall 26 of the feed arm 22.

It should be noted that the cross bar 49 is rearwardly offset from the pivot point 31 carrying the feed arm 22. Therefore, whenever the feed arm 22 is moved from the position shown in Fig. 4 to the position shown in Fig. 3, the ribbon 25 is unrolled from the roll 48 by a predetermined amount, thus rendering the ribbon 25 available for forward feeding by the ratchet means 24 in the manner hereinbefore described. It may be desirable to roughen the surface of the cross bar 49 or provide it with other frictional means for frictionally engaging the rear surface of the ribbon 25 when unrolling the ribbon from the roll 48

The operation of the device is extremely simple. Tape from the magazine reel is extended through channel 5 and attached to the take-up reel. The take-up reel is rotated until the desired point is reached at which a portion of the tape is to be removed. Immobilizing means 9 are snapped into tape-holding position and severing means 11 actuated. The left-hand immobilizing means are liberated and the tape pulled from the magazine reel until the section of tape to be removed is exposed and the end of such section is above zone 10. Holding means 9 is again snapped down, and the severing means actuated, thereby cutting off that portion of tape 4 which was to be discarded. This leaves remaining tape 4 with its ends in abutting, end-to-end relation in channel 5, whereupon the operator swings arm 22 forward and presses on knob 42. Upon releasing the knob, arm 22 swings back, leaving a perfectly spliced joint in zone 10.

In case this tape-splicing apparatus is used for sound editing a magnetically recorded paper tape of the type hereinbefore mentioned, a magneto-acoustic transducer or magnetic reproducing head, as it is commonly called, may be positioned as shown in the dashed lines in the left-hand portion of Fig. 1 for cooperation with the tape 4 ahead of the severing and splicing point 10, thus making it possible to audibly ascertain the points in the magnetic recording where it is desired to sever such recording for removing undesired portions therefrom. The detailed construction of this magnetic reproducing head is not shown, since such is well known in the art.

It should be noted that the length of the piece of adhesive ribbon sheared from the end thereof corresponds to the width of the tape being spliced, and this arrangement makes it possible to splice tapes of various widths.

Numerous modifications and variations of this invention which are within the spirit and scope hereof will occur to those skilled in the art and all such are intended to be included and comprehended herein. For example, the exact construction of the apparatus of the invention may be modified within wide limits. The reels may be modified or dispensed with, if desired. The guide rollers may be dispensed with. The locking and tape-immobilizing means may be modified in any desired manner. The tape-severing means may assume a number of different forms and may be inclined at various angles, if desired. The means for unrolling the ribbon may be modified or dispensed with entirely, if desired. The means for feeding the adhesive ribbon toward the splicing zone may be modified within wide limits, as may the means for pressing said ribbon into adhesive contact and shearing it from the balance of the ribbon. It is not essential that the adhesive ribbon be applied from the top as shown herein; it may be applied from the bottom, from either side, or from any combination of these directions, if desired, without departing from the spirit of this invention.

It should be noted that the preferred form of pressure-sensitive, adhesive ribbon comprises a hydrophilic cellulose base which may be coated with a suitable bonding primer and a water-insoluble, pressure-sensitive, adhesive coating which may be of a rubber resin type or various other types. One such ribbon is commonly known as "Scotch cellulose tape." However, the present invention is not limited to such ribbon and may employ various types of pressure-sensitive, adhesive ribbons. Thermo-sensitive or thermo-adhesive ribbons may also be used, but the device must then include a presser foot provided with heating means.

The examples described and illustrated herein are exemplary only and are not intended to limit the scope of this invention, which is to be interpreted in the light of the appended claims only.

We claim:

1. In a splicer adapted to splice flat, flexible tape in end-to-end, aligned relationship in the same plane, the combination of: a tape magazine reel and a tape take-up reel laterally spaced therefrom, said reels being arranged to pay out tape from the magazine reel and take up tape on the take-up reel upon actuation thereof; a tape-guiding channel positioned between the reels arranged to carry the tape therebetween; at least two selectively operable friction means for locking and immobilizing said tape in said channel; severing means for selectively severing the immobilized tape at a tape-severing point between the tape-immobilizing means; guide rollers arranged for selective cooperation with the tape for retaining the tape within the channel; ribbon-applying means arranged to press the end of a pressure-sensitive ribbon into adhesive contact with the adjacent surfaces of the adjacent, contiguous, aligned, severed ends of the tape for splicing said tape together; and ribbon shearing means arranged to shear from the balance of said ribbon the end thereof in adhesive contact with the spliced tape.

2. Apparatus of the character stated in claim 1, wherein the ribbon-applying means comprises a presser plate carried by the forward end of the feed arm arranged upon downward pivotal movement of the feed arm to press a portion of the forward end of the adhesive ribbon into firm, adhesive contact with the adjacent, upper surfaces of the adjacent, contiguous, aligned, severed ends of the tape for splicing said tape together, said presser plate being normally spring-biased out of contact with the tape.

3. Apparatus of the character stated in claim 1, wherein the ribbon-shearing means is carried by the forward end of the feed arm immediately behind the presser plate and arranged to shear the portion of the ribbon pressed into contact with the tape by the presser plate from the balance of said ribbon subsequent to the application of pressure to the splice by the presser plate.

4. In a splicer adapted to splice flat, flexible tape in end-to-end, aligned relationship in the same plane, the combination of: a tape-guiding channel arranged to carry and guide a tape to be spliced; selectively operable friction means for locking and immobilizing the tape in said channel; severing means for selectively severing the immobilized tape at a tape-severing point; ribbon-applying means arranged for pressing a portion of pressure-sensitive ribbon into adhesive contact with the adjacent surfaces of the adjacent, contiguous, aligned, severed ends of the tape for splicing said tape together; and shearing means arranged for shearing said portion from said ribbon along a longitudinal edge of tape in said channel.

5. In a splicer including a magazine reel and a take-up reel for tape to be spliced, the combination of: a tape guiding channel positioned between said reels and arranged to receive tape from said reels; two selectively operable spaced means for holding tape in said channel; selectively operable severing means for severing tape at a point between the spaced holding means; and a manually operable splicing means including a feed arm pivoted for movement in a plane transverse to the longitudinal edges of tape in the guiding channel, a supply of pressure-sensitive adhesive strip, a presser foot, a knife for cutting said adhesive strip, and means for actuating said knife to cut said adhesive adjacent the longitudinal edge of the tape in the channel after the presser foot has pressed the adhesive strip into contact with tape in said channel.

6. In a splicer adapted to splice flat, ribbon-like tape in end-to-end aligned relationship in the same plane, the provision of: a tape guiding channel arranged to receive tape to be spliced; two selectively operable spaced holding means to immobilize tape in said channel with ends thereof in virtually abutting relation and longitudinal edges in alignment; a supply of pressure-sensitive adhesive strip and a manually operable splicing means in operative relation to said guiding channel including a feed arm pivotally mounted for movement in a plane transverse to the longitudinal edges of tape in the guiding channel and between the spaced holding means, a presser foot at one end of the feed arm, a knife for severing an adhesive strip positioned beneath the presser foot, and means for actuating the knife upon pivotal movement of the feed arm and pressure contact of the presser foot with tape in said channel.

7. A splicer of the character stated in claim 6 wherein the feed arm is mounted to move upon a pivotal axis parallel to the longitudinal edges of tape in the guiding channel and the knife is arranged to sever the adhesive strip along a longitudinal edge of tape in the channel.

8. A splicer of the character stated in claim 6 wherein the feed arm is provided with spring means normally biasing said feed arm and presser foot into normal position out of contact with tape in the guiding channel.

9. In a splicer the combination of channel guide means for holding end portions of tape to be spliced with such ends in substantially abutting relation and in a common plane, the longitudinal edges of said tape being in alignment; means for supporting a supply of adhesive strip in operative relation to the guide means; a feed arm between the supply supporting means and guide means, said feed arm being mounted for pivotal movement upon an axis parallel to the longitudinal edges of the tape in the guide means; a presser foot carried by one end of the feed arm; and an actuating assembly carried by the end of said arm, said assembly including a knife arranged to sever the adhesive strip along a longitudinal edge of tape in said channel guide means after said adhesive strip has been pressed onto the tape by the presser foot.

10. A splicer of the character stated in claim 9 including spring means normally pressing said feed arm into position with the presser foot out of contact with tape in the channel guide.

ELIOT H. DANIEL.
KENNETH L. DARBY.

REFERENCES CITED

The following references are of record in the file of this patent:

UNITED STATES PATENTS

| Number | Name | Date |
|---|---|---|
| Re. 18,322 | Krueger | Jan. 5, 1932 |
| Re. 22,945 | Engberg | Dec. 2, 1947 |
| Re. 22,981 | Fitch | Mar. 9, 1948 |
| 1,364,844 | Mortimer | Jan. 4, 1921 |
| 1,809,339 | Hayden | June 9, 1931 |
| 2,026,911 | Osgood | Jan. 7, 1936 |
| 2,037,776 | Freeman et al. | Apr. 21, 1936 |
| 2,231,383 | Goldberg | Feb. 11, 1941 |
| 2,346,874 | Russell | Apr. 18, 1944 |
| 2,446,576 | DeVry | Aug. 10, 1948 |